May 22, 1923.
S. Y. MONCKTON
LUBRICATING MECHANISM
Filed April 6, 1921
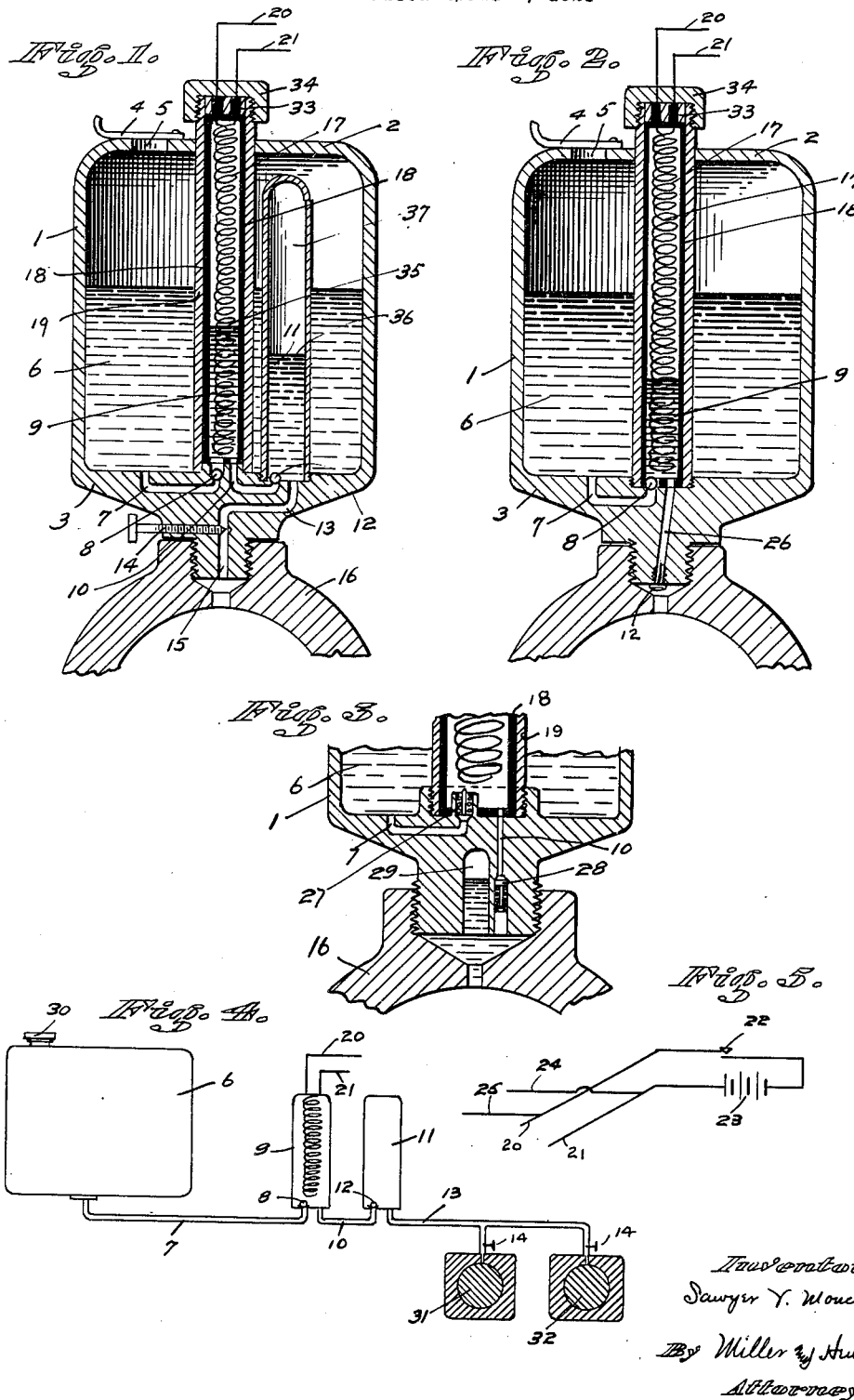

Patented May 22, 1923.

1,456,327

UNITED STATES PATENT OFFICE.

SAWYER Y. MONCKTON, OF SAN FRANCISCO, CALIFORNIA.

LUBRICATING MECHANISM.

Application filed April 6, 1921. Serial No. 458,989.

*To all whom it may concern:*

Be it known that I, SAWYER Y. MONCKTON, a citizen of the United States, and resident of the city and county of San Francisco, State of California, have invented new and useful Improvements in Lubricating Mechanism, of which the following is a specification.

My invention has for its object means whereby journal bearings or other moving parts which it is desired to lubricate may be supplied with lubricant from a remote point as desired. A further object is to supply lubricant at periodic intervals to surfaces otherwise in frictional contact. Another object is to supply a lubricant to surfaces moving relatively to each other by maintaining the lubricant under pressure between them. A further object is the maintenance of lubricant in relatively more fluid condition by introducing at or near the bearing surface to be lubricated a reservoir of lubricant which may be warmed to any degree and at any intervals required, through passage of electric current through a resistance. Another object is the provision of a primary and secondary oil reservoir with an injecting device therebetween and valves and connections to the primary and secondary reservoir whereby oil may be abstracted from the primary reservoir and stored under pressure in the secondary reservoir and where the injecting device may be actuated from a remote point.

By referring to the accompanying drawings my invention will be made clear.

Fig. 1 illustrates my invention in simple form.

Fig. 2 illustrates another form similar to Fig. 1 but without the secondary container or pressure reservoir.

Fig. 3 is a fragmentary showing of the lower part of an oil reservoir injector mechanism and reservoir mounted upon the upper part of a well known shaft bearing or pillow block.

Fig. 4 illustrates somewhat diagrammatically the arrangement of primary and secondary oil compartments or reservoirs and with the injector device interposed therebetween and with the mechanism arranged to feed a plurality of bearings.

Fig. 5 is a diagrammatic view illustrating the electric circuit which energizes the resistance coil to warm the lubricant.

Throughout the figures similar numerals refer to identical parts.

The outer walls of a standard form of oil cup are indicated by the numeral 1, having a top 2 and bottom member 3. In the cover or top is a slide 4 which is adapted to cover or uncover the passage 5 through which oil or lubricant may be introduced into the chamber 6. Communicating with the lower part of the chamber 6 is a passage 7 which leads into the injector compartment 9 by the one-way valve 8. Leading from the chamber 9 is the duct or passage 10 which communicates with the secondary oil reservoir 11 by the valve 12. From the secondary chamber 11 the passage or tube 13, having interposed therein the needle valve 14, which constitutes means for restricting the flow through the tube 13 and communicates with the outlet 15 through which the lubricant finds egress to any bearing or friction surface with which the device may be connected, as the well known pillow block a fragment of which is shown at 16. Within the injector compartment 9 I introduce the resistance wire 17 suitably insulated as at 18, 18, from the chamber walls which are shown at 19. The resistance wire is adapted to be energized by the electric circuit 20, 21 adapted to be actuated by the key 22 and source of electrical energy 23. Branch conductors 24, 25 may be employed to supply other injector devices not shown.

Resistance coil 17 is sealed as at 33 and preferably capped at 34, and within 9, the oil may be caused to rise or be expelled according as the resistance coil 17 is cold or relatively hot, the oil being drawn in from the passage 7 by the valve 8 or expelled through the passage 10 by the valve 12, Figs. 1, 3 and 4 or through the passage 26 of Fig. 2.

Referring particularly to Fig. 2 it will be seen that in this case the secondary oil reservoir 11 of Fig. 1 has been omitted and the lubricant is permitted to flow directly from the injector 9 through the passage way 26 to the surface to be lubricated, by the check valve 12.

Referring particularly to Fig. 3 I have shown different form of valves at 27, 28 to control the passages 7 and 10, respectively, and the air chamber is made integral with the base 3 as indicated at 29.

Referring particularly to Fig. 4, the primary oil reservoir is indicated at 6 having an inlet at 30, an outlet passage 7 and injector chamber at 9 and inlet valve 8 and passage 10 to a secondary pressure reservoir 11 with the valve 12 interposed therebetween, and an outlet passage 13 to a plurality of members as 31, 32 adapted to be lubricated.

The operation is as follows:

A suitable supply of lubricant is introduced into the chamber 6 and contact is made with the key 22 energizing the resistance 17 which heats any fluid content in the compartment 9 expending and therefore expelling the same. The flow of this fluid is prevented by the valve 8 from entering the passage 7 and is therefore forced through the passage 10 by valves 12, Figs. 1, 3 and 4 or passage 26 and valve 8 of Fig. 2. The key is now released and contraction of the fluid contained in the compartment 9 results in the seating of the valves 12 or 28 and the unseating of valves 8 or 27 followed by an inflow of lubricant through the passage 7 from the compartment 6. The injector column is therefore recharged with lubricant as to a level 35 and a reenergization of the resistance 17 by depressing the key 22 causes a further expansion within the chamber 9 due to the heating of the resistance 17 and the expelling of the lubricant contained therein through the passage 10 in the case of Figs. 1, 3 and 4 into the secondary lubricant or fluid pressure chamber or reservoir 37 as to the level 36 compressing the air or gas contained in the upper part of the said chamber 37 and thereby establishing a pressure against the lubricant contained therein and tending to force it through the passage 13 and by the control valve 14 to lubricate the bearing 16. In the case of Fig. 2 the lubricant is ejected directly from the chamber 9 through the passage 26 upon the heating of the resistance wire 17 without the employment of the pressure chamber 11. In this way oil or heavy grease may be fed as often as desired directly to the bearing, whereas in the structure shown in Figs. 1, 3 and 4 a supply of oil under pressure may be established as often as required in the secondary oil reservoir and thereafter is caused to flow from said secondary reservoir due to the pressure established therein and by a restricted passage or by a valve restriction 14, and continues to feed slowly to the said bearing until the pressure in the fluid pressure chamber 37 has expended itself.

I claim:

1. In a lubricating device, a chamber adapted to contain lubricant, an injector compartment and a resistance element therein, connections adapted to energize said resistance and thereby heat said compartment, a one-way valve between said chamber and said compartment, and a duct adapted to convey lubricant away from said compartment when the resistance is energized.

2. Apparatus as set forth in claim 1, and a fluid pressure chamber into which said duct leads and an inlet valve permitting the inflow but preventing the outflow of said lubricant and a tube through which lubricant is forced from said pressure chamber.

3. Apparatus as set forth in claim 1, and a fluid pressure chamber into which said duct leads and an inlet valve permitting the inflow but preventing the outflow of said lubricant and a tube through which lubricant is forced from said pressure chamber, and means restricting the flow through said tube.

4. Apparatus as set forth in claim 1 wherein said compartment is arranged within said chamber.

5. Apparatus as set forth in claim 1 and a fluid pressure chamber into which said duct leads and a one-way valve in said duct permitting the inflow to said pressure chamber but preventing the outflow of said lubricant, and a tube through which lubricant is forced from said pressure chamber; and wherein said compartment and said pressure chamber are arranged within said chamber.

6. Apparatus as set forth in claim 1 and a fluid pressure chamber into which said duct leads and a one-way valve in said duct permitting the inflow to said pressure chamber but preventing the outflow of said lubricant, and a tube through which lubricant is forced from said pressure chamber; and wherein said compartment and said pressure chamber are arranged within said chamber, and means restricting the flow through said tube.

7. Apparatus as set forth in claim 1 and a fluid pressure chamber into which said duct leads and a one-way valve in said duct permitting the inflow to said pressure chamber but preventing the outflow of said lubricant, and a tube through which lubricant is forced from said pressure chamber; and wherein said compartment and said pressure chamber are arranged within said chamber, and a base to said chamber within which base is located said pressure chamber.

8. In a lubricating system a plurality of lubricating devices, each comprising a chamber, a closed compartment having an electric resistance therein constructed and adapted to discharge lubricant from said compartment when said resistance is energized and circuit connections whereby said resistances may be energized from a remote point.

SAWYER Y. MONCKTON.